219-121 SR
2/23/88 OR 4,727,236

United States Patent [19]
Hull et al.

[11] Patent Number: 4,727,236

[45] Date of Patent: Feb. 23, 1988

[54] COMBINATION INDUCTION PLASMA TUBE AND CURRENT CONCENTRATOR FOR INTRODUCING A SAMPLE INTO A PLASMA

[75] Inventors: Donald E. Hull; Thomas M. Bieniewski, both of Los Alamos, N. Mex.

[73] Assignee: The United States of America as represented by the Department of Energy, Washington, D.C.

[21] Appl. No.: 867,127

[22] Filed: May 27, 1986

[51] Int. Cl.[4] .......... B23K 9/00

[52] U.S. Cl. .......... 219/121 PR; 219/121 PM; 219/10.43; 219/121 P; 315/111.51

[58] Field of Search .......... 219/121 PR, 121 PM, 219/121 P, 10.43, 10.75, 10.79; 315/111.51, 111.21

[56] References Cited

U.S. PATENT DOCUMENTS 3,586,905 6/1971 Bignell .......... 219/121 PR
4,431,891 2/1984 Forstner et al. .......... 219/10.43
4,431,901 2/1984 Hull .......... 219/121 PR
4,551,609 11/1985 Falk .......... 219/121 PR
4,631,381 12/1986 Delage et al. .......... 219/10.43

*Primary Examiner*—M. H. Paschall
*Attorney, Agent, or Firm*—Ray G. Wilson; Paul D. Gaetjens; Judson R. Hightower

[57] ABSTRACT

An induction plasma tube in combination with a current concentrator. The current concentrator has a substantially cylindrical body having an open end and a partially closed end which defines an aperture. A first slot extends the longitudinal length of the cylindrical body and a second slot extends radially outward from the aperture. Together the first and second slots form a single L-shaped slot. The current concentrator is disposed within a volume bounded by an induction coil substantially along the axis thereof, and when power is applied to the induction coil a concentrated current is induced within the current concentrator aperture. The concentrator is moveable relative to the coil along the longitudinal axis of the coil to control the amount of current which is concentrated at the aperture.

4 Claims, 5 Drawing Figures

COMBINATION INDUCTION PLASMA TUBE AND CURRENT CONCENTRATOR FOR INTRODUCING A SAMPLE INTO A PLASMA

BACKGROUND OF THE INVENTION

The invention disclosed herein is generally related to high frequency induction plasma tubes, and more specifically to a device for enabling solid and liquid samples to be introduced into a plasma generated by a high frequency induction plasma tube. This invention is the result of a contract with the Department of Energy (Contract No. W-7405-ENG-36).

High frequency induction plasma tubes are well known for producing high temperature gaseous plasmas. Such plasmas are useful in a number of practical applications including high temperature spectroscopic studies and preparation of microcrystalline refractory materials.

Induction plasma tubes known in the art generally include an electrical induction coil surrounding an enclosure which contains a gas. The coil is connected to a source of high frequency (400 kHz to 5 MHz) electrical power. Typically, enclosures consist of a quartz tube located inside the coil. Argon is a commonly used ionizable gas. Upon application of power to the induction coil the gas is ionized, producing a central core of hot gaseous plasma inside the enclosure.

At low power levels the plasma is concentrated in the center of the enclosure reducing the danger of heat damage to the enclosure walls. At high power levels, however, the plasma core is both hotter and larger in diameter. As a result, the quartz enclosure is easily damaged by the plasma, which typically attains temperatures higher than 10,000° C. This problem is aggravated by the fact that the plasma is subject to magnetic and electrical instabilities that cause it to fluctuate in position and occasionally contact the enclosure walls. Operation at high power levels also results in the emission of intense ultraviolet radiation from the plasma, which ionizes the air around the enclosure and may result in electrical arcing in the induction coil. These adverse effects have been overcome by the use of internal water-cooled shields as described and disclosed in U.S. Pat. No. 4,431,901 issued on Feb. 14, 1984, the teachings of which are hereby incorporated by reference herein.

By using a thick segmented shield shaped in cross section to occlude line-of-sight transmissions of light, it is possible to get induction heating of the plasma because a current is induced around each of the individual segments. Without occluding line of sight transmissions of ultraviolet radiation from the plasma, the air around the windings is ionized which promotes arcing between coil turns. A counterflow cooling system is used to cool the individual segments. Such an improved shielding system makes it possible to maintain a stable plasma at temperatures on the order of 10,000° C.

One problem, not addressed by the above-referenced patent, is the substantial difficulty of introducing a sample into the plasma. Solid materials placed in the plasma reach a maximum temperature much lower than that of the plasma. Consequently, introducing a sample by placing it in a crucible within the plasma is unsatisfactory. The induction field is too weak to support significant sample vaporization. Furthermore, such an arrangement lacks sufficient operator control over such important operating parameters as crucible temperature, plasma pressure and temperature, and plasma gas flow rate. Any functioning analytical system requires close control over these parameters, and the subject invention provides a practical solution to the control of these process parameters.

SUMMARY OF THE INVENTION

Accordingly, it is an object of the present invention to provide an apparatus and method for introducing samples into a high temperatures plasma.

Additional objects and advantages of the invention will be set forth in part in the description that follows, and in part will become apparent to persons of ordinary skill in the art upon examination of the following or may be learned by practice of the invention.

To achieve the foregoing and other objects, and in accordance with the purposes of the present invention as embodied and broadly described herein, the induction plasma tube of the present invention includes an induction coil surrounding a shield which encloses a gas such as argon in combination with a passive current concentrator. The current concentrator and shield are placed within an enclosure to produce an intense current along the enclosure's longitudinal axis and in close proximity to a crucible used to hold a sample. Preferably, the shield used can be a segmented, fluid-cooled radiation shield. The current concentrator enables a sample to be introduced into the induction plasma tube of the subject invention by directly vaporizing solids, slurries or liquids. Although several configurations for the current concentrator are contemplated by the subject invention, in a preferred embodiment of the invention, the current concentrator has a generally cylindrically shaped body having one open end and a second end defining an aperture. The aperture size is chosen to be slightly larger than the sample holder used. A first narrow slot extends the longitudinal length of the cylinder and a second slot radially connects the aperture and the first slot at the end of the cylinder defining the aperture. Together the first and second slots define a single, L-shaped slot which extends from the open end of the cylinder parallel to the longitudinal axis and terminating at the aperture.

It is preferred that the current concentrator have a hollow interior allowing it to be cooled by a suitable coolant. Typically, water is circulated in the interior of the current concentrator.

In operation, the current concentrator is placed inside the shield along the longitudinal axis of the tube so that part of all of the cylindrical body therein is surrounded by the induction coils. By placing the entire cylindrical body within the volume bounded by the induction coils, maximum induction heating of a sample is achieved. The rate of vaporization may be controlled by moving the current concentrator axially relative to the induction coils, whereby only a portion of the current concentrator lies within the induction coil. This can be accomplished by either moving the coils or the concentrator. As a result of its location and design, a current is induced in the current concentrator during the operation of the induction coil. The large surface area of the cylinder allows a high current to be induced. Because of the L-shaped slot configuration in the current concentrator, the induced current is concentrated at the aperture of the cylindrical body.

Without the current concentrator, a sample placed in the plasma does not reach a high enough temperature to vaporize most solids. The sample, in this case, is not heated by induction because the relative diameters of the shield and the crucible cause poor inductive coupling. However, with the current concentrator in place, an intense induction field is created in close proximity to the sample which is placed on a graphite rod or crucible and inserted within the aperture. In this way the sample is heated primarily by induction. It has been found that good coupling is not achieved by simply moving the sample away from the longitudinal axis without using a current concentrator.

An advantage of using the above described current concentrator is that the induction plasma tube will vaporize, atomize, and ionize solids so that no molecules will survive. Such atomization of sample material without cogeneration of molecules is particularly advantageous in optical and mass spectrometric analyses because interference from molecular species present in all conventional analytical sources is largely eliminated. That is, in optical emission spectroscopy, molecular interference (for example, CN or OH molecules) generally renders significant portions of the generated spectra unusable for analysis. Similarly in mass spectroscopy, molecular interference frequently masks completely the desired mass peak. These problems are overcome by introducing a sample into the plasma using a graphite rod and current concentrator. Conditions in the plasma are so energetic that all molecular bonds are broken and ions and atoms are formed.

An advantage of using a segmented shield induction plasma tube is that matrix effects are eliminated. Matrix effects occur when easily ionized material is present in the sample that can alter the degree of ionization observed from the other elements in the sample. Because the plasma tube generates an electron density of approximately $10^{16}$ electrons/$cm^3$ (about two orders of magnitude greater than conventional sources), the matrix effect will either be eliminated or at least greatly diminished. This electron density is obtained with approximately 10 kW of power deposited in the plasma at approximately 1 atm (580 torr at an altitude of 7,300 feet).

As mentioned above, gas such as argon is typically used to form a plasma. In some applications of the plasma tube, however, it is possible to evacuate the enclosure and form a plasma from the vaporized sample itself.

These and other aspects of the invention are more fully set forth in the following detailed description of the preferred embodiments and in the accompanying drawings.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings.

DETAILED DESCRIPTION OF THE PREFERRED EMBODIMENTS

Figure 1:
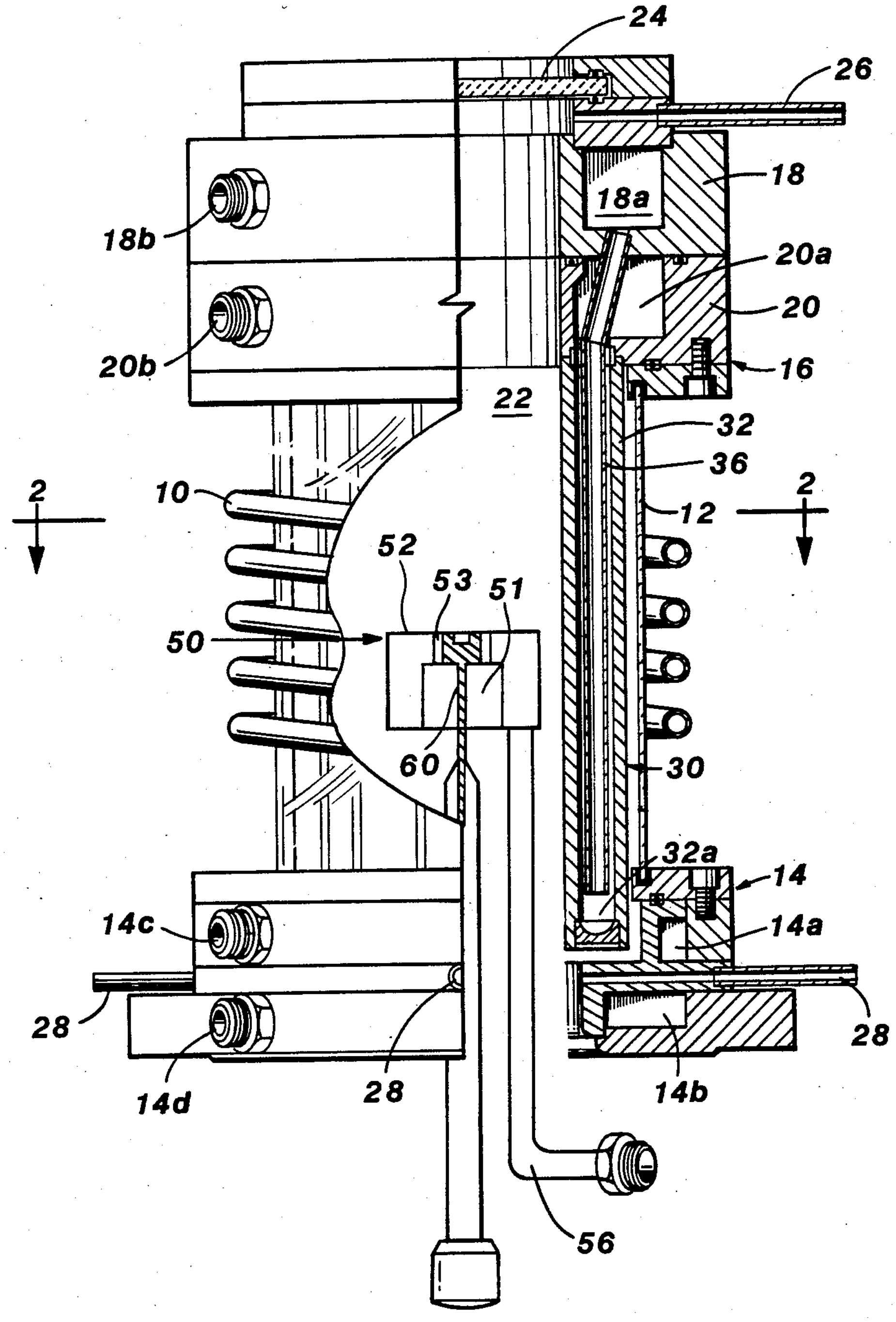
FIG. 1. is a side elevation view in partial cross section of the induction plasma tube and current concentrator of the present invention.
Figure 2:
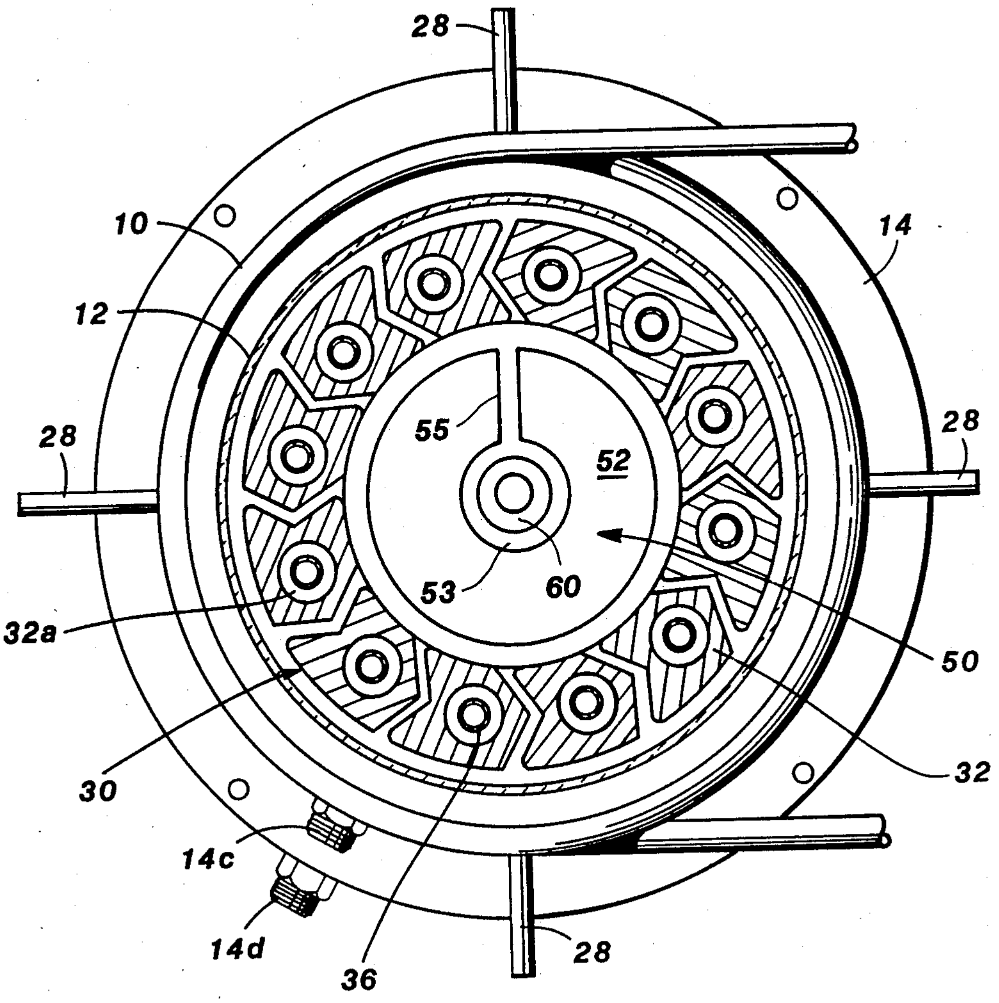
FIG. 2 is a plan view in cross section of the embodiment illustrated in FIG. 1, taken along section line 2—2 of FIG. 1.

A preferred embodiment of the invention, illustrated in FIGS. 1 and 2, generally includes a water-cooled copper induction coil 10 which surrounds a tubular quartz enclosure 12. The enclosure 12 extends upwardly from a water-cooled base 14 to an upper assembly 16 which includes a water supply manifold 18 and a water exhaust manifold 20. The supply and exhaust manifolds 18 and 20 include annular interior water channels 18*a* and 20*a*, respectively, which are connected to exterior supply supply and exhaust water fittings 18*b* and 20*b*, respectively. Likewise, the base 14 includes annular interior water cooling channels 14*a* and 14*b* which are connected to one another and which are connected to exterior water supply and exhaust fittings 14*c* and 14*d*, respectively. The base 14 and the manifolds 18 and 20 are all annular so as to define a central cylindrical cavity 22 wherein a plasma may be formed by application of a high frequency electrical current to the induction coil 10. A quartz window 24 is mounted on top of the upper assembly 16 for viewing the plasma formed in the central cavity.

The plasma tube further includes, in the illustrated embodiment, a plasma gas intake tube 26 at the top of the upper assembly 16. The intake tube 26 is used to admit a gas such as argon into the cavity 22 and for maintaining a static pressure or a flow of such gas downward through the tube. The plasma tube may include a set of four process gas intake tubes 28 which open into the lower end of the cavity 22. These tubes could be used to introduce gaseous reactants into the plasma arc downstream from the coil 10. It is possible, however, to premix the gaseous reactants with the argon. The exhaust can be introduced directly into the atmosphere through exhaust tubes or can be introduced into a scrubber system. It should be noted that although argon is typically used in this invention to form the plasma, in some applications of the invention where it is important to minimize impurities, a plasma may be formed from a solid sample which is vaporized when a high frequency current is applied to the induction coil.

Figure 3:
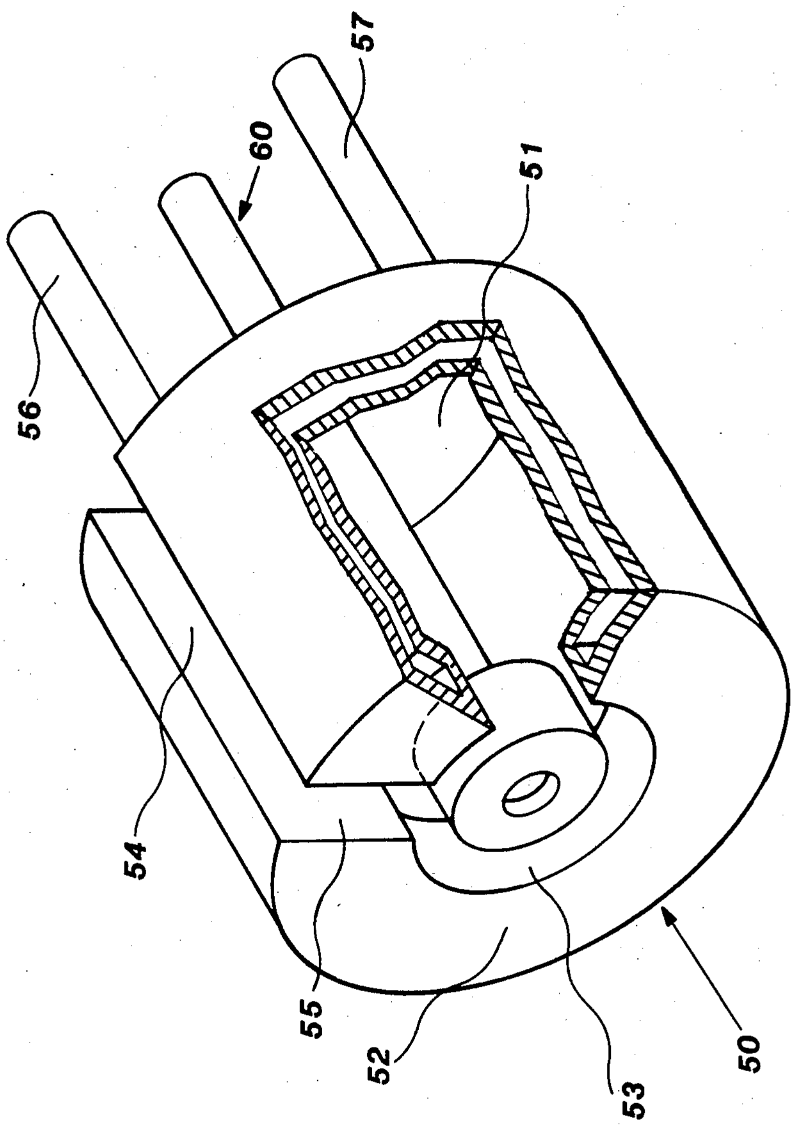
FIG. 3 is an isometric pictorial view of the current concentrator.

The plasma tube shown in FIGS. 1 and 2 additionally shows the current concentrator 50, further illustrated in FIG. 3. The current concentrator 50 is disposed within and has a common longitudinal axis with the central cylindrical cavity 22. Preferably, the current concentrator is positionable along the central longitudinal axis so that it can be moved relative to the cylindrical volume defined by the induction coil 10. This can be done by either moving the current concentrator or by moving the induction coils.

The induction plasma tube of the present invention includes a segmented shield 30 which consists of twelve substantially identical thick-walled copper members 32. The tubes are affixed at their upper ends to the water exhaust manifold 20 and extend downwardly therefrom along the inside of the tubular quartz enclosure. U.S. Pat. No. 4,431,901, supra, describes the shield configurations used with the present invention. Each tube 32 includes a water supply tube 36 which extends from the water supply channel 18*a* into a central longitudinal bore 32*a* of the segmented shield. An alternative to the shield cooling configuration taught by this patent would be a partition cooling system whereby each shield has a partition which extends from the water supply channel, almost the entire length of the segmented shield. Water is pumped up one side of the partition and down the other. The segmented shield cooling systems are connected in series. It is believed that this partition cooling system is more efficient that the counterflow cooling system.

The plasma tube is typically operated at a frequency of 400 kHz to 5 MHz, at a power level of approximately 50 kW or higher applied to the induction coil.

The current concentrator shown in FIG. 3 is substantially cylindrical and has an open end 51 and a partially closed end 52. The partially closed end 52 defines an opening 53 which allows an induced current to be in close proximity to a graphite sample holder 60. The cylindrical geometry provides a large surface area for inducing a current in the current concentrator as a result of its proximity to the induction coil 10. (FIG. 1) To provide concentrated induced current in order that a sample placed on the sample holder 60 is induction heated, a first slot 54 is provided which extends the longitudinal length of the current concentrator 50 approximately parallel to the axis thereof. A second slot 55 extends radially away from opening 53 defined in the partially closed end of the concentrator 50 to the first slot 54. Coolant is supplied to the space between the interior and exterior walls via a concentrator coolant inlet 56. The coolant circulates through the concentrator and exits via a concentrator coolant exhaust 57.

Slots 54 and 55 together form a single L-shaped slot which directs an induced current toward the partially closed end of the current concentrator 52. Current is induced to flow down one side of slot 55, around the opening 53, and back up the other side of the second slot 55. The induction field in the opening 53 heats a sample disposed on the graphite sample holder 60.

Figure 4:
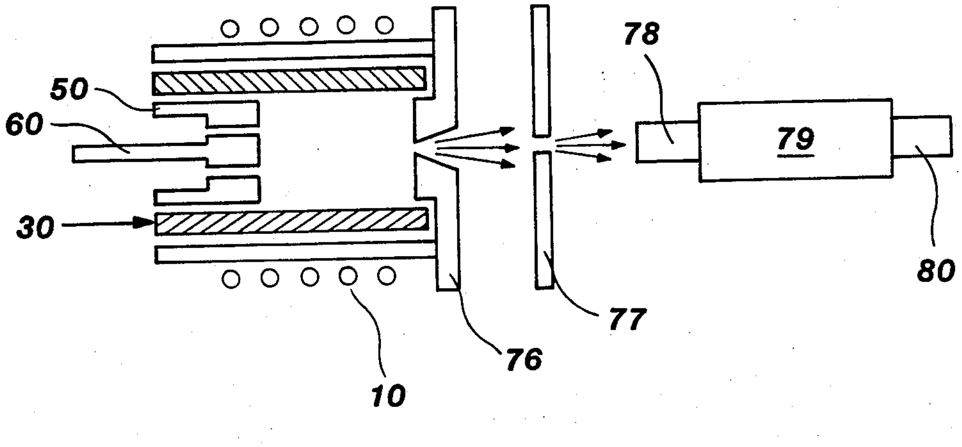
FIG. 4 is a schematic of the induction plasma tube and current concentrator combination of the present invention for use in mass spectrometry.
Figure 5:
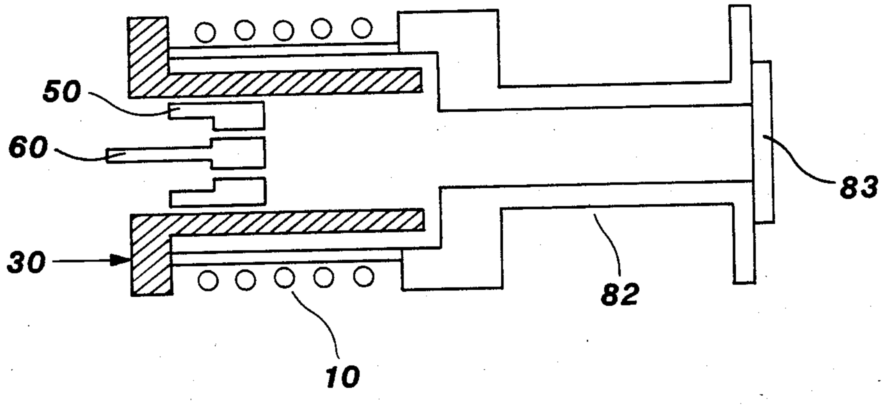
FIG. 5 is a schematic of the induction plasma tube and current concentrator combination of the present invention for use in optical detection.

FIGS. 4 and 5 show schematic representations of two configurations of the subject invention, each representing a different use of the induction plasma tube. FIG. 4 shows a plasma tube configuration for use in mass spectroscopy. Shown are two water-cooled copper draw out nozzles 76 and 77 in combination with standard mass spectrometric equipment which might include an ionizer 78, a quadrupole section 79, and a standard detector 80 (as in the example shown).

FIG. 5 shows the configuration of the induction plasma tube for use in optical detection via a quartz window 83. Element 82 is a water cooled transition zone.

The foregoing description of an embodiment of the invention has been presented for purposes of illustration and description. It is not intended to be exhaustive or to limit the invention to the precise forms disclosed. For example, although twelve segmented shields are shown in the illustrated embodiment, there can be any number of shield segments. Similarly, although the current concentrator has been described as having a cylindrical shaped body, it can have any shape as long as the current is directed to the area of a sample in substantially the same way as the disclosed invention. The embodiments and uses of the invention were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An induction plasma tube comprising in combination:

a. a substantially cylindrical electrical induction coil having a central longitudinal axis, a tubular enclosure centered approximately coaxially on the axis and located within said coil, and a radiation shield centered approximately coaxially on the axis inside said enclosure;

b. a current concentrator coaxially disposed within said electrical induction coil and having means for inducing a current in close proximity to the axis; and c. a sample holder disposed substantially on the axis of said electrical induction coil and adjacent said current concentrator effective to heat a sample disposed thereon by induction heating from said current concentrator.

2. The induction plasma tube as described in claim 1 wherein said current concentrator includes a generally cylindrical body having an open end and a partially closed end, said partially closed end defining an aperture for positioning a sample so the sample is in close proximity to the perimeter of the aperture, said generally cylindrical body having a first slot which extends the length of said cylindrical body in a direction parallel to said central longitudinal axis and a second slot which extends radially outward from the aperture defined by the substantially closed end of said cylindrical body, said first slot and second slot intersecting to define a single, substantially L-shaped slot.

3. The induction plasma tube as defined in claim 2 wherein said cylindrical body is water cooled.

4. The induction plasma tube as defined in claims 1, 2, or 3, wherein said radiation shield is a segmented metal radiation shield centered coaxially on said axis inside said enclosure, said shield comprising a plurality of elongate fluid-cooled metal shield segments extending parallel to said axis, said segments being disposed in a circular configuration substantially adjacent to the interior surface of said enclosure and being substantially equally spaced apart circumferentially such that said shield has an overall generally tubular configuration, said shield segments being shaped in cross section so as to occlude the line-of-sight transmission of light through the radiation shield.

* * * * *